United States Patent [19]

Koorn et al.

[11] Patent Number: 4,951,450
[45] Date of Patent: Aug. 28, 1990

[54] MOWING MACHINE

[75] Inventors: Maarten Koorn, Vlaardingen; Sape Sikkema, Maassluis, both of Netherlands

[73] Assignee: C. van der Lely N.V., Maasland, Netherlands

[21] Appl. No.: 340,774

[22] Filed: Apr. 20, 1989

[30] Foreign Application Priority Data

Apr. 21, 1988 [NL] Netherlands ............... 8801039

[51] Int. Cl.$^5$ .................................... A01D 34/66
[52] U.S. Cl. .................................... 56/13.6; 56/14.9; 56/15.5; 56/15.8; 56/255
[58] Field of Search ............... 56/6, 13.6, 14.9, 15.5, 56/15.7, 15.8, 208, 255, 295

[56] References Cited

U.S. PATENT DOCUMENTS

| | | | |
|---|---|---|---|
| 3,517,491 | 6/1970 | Lausch et al. | 56/14.9 X |
| 4,085,571 | 4/1978 | Mortier et al. | 56/208 |
| 4,253,294 | 3/1981 | Zweegers | 56/13.6 |
| 4,428,181 | 1/1984 | Van Staveren et al. | 56/13.6 |
| 4,671,050 | 6/1987 | van der Lely | 56/13.6 X |
| 4,694,640 | 9/1987 | Ermacora et al. | 56/13.6 X |
| 4,719,742 | 1/1988 | Ermacora et al. | 56/13.6 X |
| 4,809,488 | 3/1989 | Neuerberg et al. | 56/13.6 |
| 4,838,013 | 6/1989 | Arnold et al. | 56/13.6 |

FOREIGN PATENT DOCUMENTS

| | | |
|---|---|---|
| 0009134 | 4/1980 | European Pat. Off. . |
| 0068560 | 1/1983 | European Pat. Off. . |
| 0118952 | 9/1984 | European Pat. Off. . |
| 0177091 | 4/1986 | European Pat. Off. . |
| 0242311 | 10/1987 | European Pat. Off. . |
| 0251049 | 1/1988 | European Pat. Off. . |
| 2171674 | 9/1973 | France . |
| 8102966 | 10/1981 | PCT Int'l Appl. . |
| 2089634 | 6/1982 | United Kingdom . |

Primary Examiner—George A. Suchfield
Attorney, Agent, or Firm—Penrose Lucas Albright

[57] ABSTRACT

A mowing machine comprising a cutter bar having rotary mowing members arranged thereabove. The cutter bar is connected for its support in two places to a carrier frame. One of these connections includes a flexible member, constituted by a resilient element, which permits relative limited movement between the carrier frame and the portion of the cutter bar that is contiguous to the connection. The resilient connection can be attached to a mowing member mounted on the cutter bar or outside the reach of the mowing members by means of an upwardly extending connection beam which is rigidly connected to the carrier frame at its upper end and is connected to the cutter bar at its lower end via a horizontal resilient element.

40 Claims, 7 Drawing Sheets

MOWING MACHINE

BACKGROUND OF THE INVENTION

The invention relates to a mowing machine comprising a cutter bar which extends substantially transversely to the direction of operative travel over the field and having rotary mowing members arranged thereabove. The cutter bar is connected in at least two places to a carrier frame, at least one of the connections includes a flexible member which permits a relatively limited movement between the carrier frame and the portion of the outer bar that is continuous to the connection.

By connecting the cutter bar to the carrier frame in at least two places, a framework is obtained which, to a high extent, absorbs the forces acting on the cutter bar in a direction opposite to the direction of operative travel of the mowing machine. The cutter bar, in particular when it is relatively long, is also subjected to forces which are directed upwardly in a vertical plane and may cause deformation thereof. This deformation results in an increased tension in the positions where the connections to the cutter bar and the carrier frame are provided, i.e. by the occurrence there of bending moments and forces acting in the longitudinal direction of the cutter bar. The results may manifest themselves in an unwanted wear of the transmission system which passes through the cutter bar and is required for driving the mowing members. So to obviate, at least partly, these unwanted phenomena, it is known to provide one of the connections with a pivotable element having a pivot shaft extending in the direction of operative travel of the mowing machine. This measure, however, does not provide the desired tension relief for the connections.

SUMMARY OF THE INVENTION

The invention has for its object to improve this tension relief. To that end, according to the invention, the flexible member comprises a resilient element. This resilient element renders it possible to reduce to a significant extent not only the bending moments occurring in the connections but also the forces acting in the longitudinal direction of the cutter bar. According to the invention, the resilient element is arranged in such a manner that movements of the cutter bar relative to the carrier frame are permitted in a substantially vertical plane transverse to the direction of operative travel. In this regard, to a sufficient extent the framework retains the ability to absorb the forces exerted in a direction opposite to the direction of operative travel.

Furthermore, in accordance with the invention, the resilient connection can be effected both via a mowing member arranged on the cutter bar or outside the reach of the mowing members.

In a special embodiment, the cutter bar is connected to the carrier frame in two positions via different mowing members, for example, the two outermost ones. More specifically, one or more mower members are provided with a substantially drum-shaped crop guide, a connection between the cutter bar and the carrier frame then extending via or through one of the crop guides.

Preferably, the resilient element is provided with plate-shaped material which extends in a substantially vertical plane parallelling the direction of operative travel. In particular, the resilient element consists of a metal plate, for example, a leaf spring having a thickness of three to four millimeters, which is connected near its upper edge to the carrier frame and near its lower edge to members attached to the cutter bar.

In a further embodiment of the invention, the resilient element extends at least partly within a substantially drum-shaped crop guide disposed on a mowing member. In particular, the resilient element, which near its upper end is connected to the carrier frame, is connected near its lower end to a stationary supporting member arranged within a rotating crop guide. This supporting member is then connected to the relevant mowing member in such a manner that it is supported rotatably relative thereto. The supporting member is provided with a cover disposed substantially over the drum, the cover having a central aperture through which the resilient element extends. Between the cover and the carrier frame there extends a flexible sleeve, within which the resilient element and/or its connection means extend.

In a preferred embodiment not only does at least one connection have a resilient element provided between the cutter bar and the carrier frame, but the cutter bar is also connected in at least one position to the carrier frame via a pivot whose pivot shaft extends substantially horizontally in the direction of operative travel of the mowing machine. This further relieves stress at the points to which the connections to the cutter bar and the carrier frame are disposed. The carrier frame can be connected to a mowing member via this pivot.

The mowing members are drivingly interconnected via the cutter bar and are driven via a drive shaft which is connected to one of the mowing members, preferably an outermost one. The drive shaft is located at least partly within a substantially drum-shaped crop guide arranged on the relevant mowing member. The carrier frame is connected via the pivot to the mowing member which is driven by the drive shaft. In the region of the pivot shaft, the drive shaft is provided with a flexible coupling, for example, a chain coupling or a universal joint. In such an embodiment, the drive shaft is bearing-supported above the flexible coupling in a portion which is rigidly connected to the carrier frame and the drive shaft is bearing-supported below the flexible coupling in a pivot member which is pivotable about the pivot shaft relative to the carrier frame. This pivot member is located at least partly within a substantially drum-shaped crop guide arranged on the relevant mowing member. The pivot member is fitted with a cover located over the drum and is closely contiguous thereto.

As previously stated, the carrier frame may be connected via the pivot to the mowing member which is driven by the drive shaft. This is accomplished by providing the drive shaft with a flexible coupling in the region of the pivot shaft and by supporting the drive shaft below the flexible coupling in a pivot member capable of pivotal movement about the pivot shaft relative to the carrier frame. It may also be accomplished by supporting the drive shaft—without a flexible coupling—in a sleeve-shaped member which is rigidly connected to, for example, a transmission system box from which, via the drive shaft, drive of the mowing members is effected, the carrier frame being connected to the sleeve-shaped member via the pivot. In this latter embodiment, it is preferred to drive the input shaft of the transmission system via one or more belts.

As stated, the resilient connection between the cutter bar and the carrier frame can be effected both via a mowing member arranged on the cutter bar and also outside the reach of the mowing members. In the latter case, the connection comprises an upwardly extending connecting beam which at its upper end is rigidly connected to the carrier frame and at its lower end is connected to the cutter bar via the resilient element. Preferably, the lower connection to the cutter bar comprises a substantially horizontal connection element which constitutes the resilient element. As embodied, this connection element is plate-shaped and consists of, for example, a spring steel plate.

The mowing machine disclosed here can be either side-mounted or front-mounted for use on a tractor. The carrier frame of the mowing machine can alternatively be suspended from a frame with wheels; the mowing machine can then co-operate with a crusher which is also suspended from this frame. In one embodiment of the invention, the connection between the carrier frame and the cutter bar can extend via the crusher, the resilient element then being arranged between the crusher and the cutter bar.

In this embodiment, the invention relates to a mower-crusher comprising a cutter bar which extends substantially transversely to the direction of operative travel over the field and mowing members arranged thereabove, the cutter bar being connected for its support in at least two places to a carrier frame which is suspended from a first frame. The first frame providing the means by which the mower-crusher is connected to a tractor, a crusher device also being suspended from the first frame. The mower-crusher is constructed such that the connection between the carrier frame and the cutter bar is effected via the crusher device, a resilient element being arranged between the crusher device and the cutter bar. In particular, the resilient element can be provided by a spring steel plate arranged between the lower end or a point near the lower end of the crusher device and the cutter bar. This mower-crusher may also be of such a structure that it can be moved by a tractor either as a side-mounted or a front-mounted machine.

For a better understanding of the present invention and to show how the same may be carried into effect, reference will now be made, by way of example, to the accompanying drawings.

BRIEF DESCRIPTION OF THE DRAWINGS

FIG. 2 is a partial rear view of the mower-crusher of FIG. 3 is a side view of the mower-crusher of FIG. 1;

DESCRIPTION OF THE PREFERRED EMBODIMENTS

In the drawings, which show the implement schematically, corresponding components are denoted by the same reference numerals.

Figure 1:
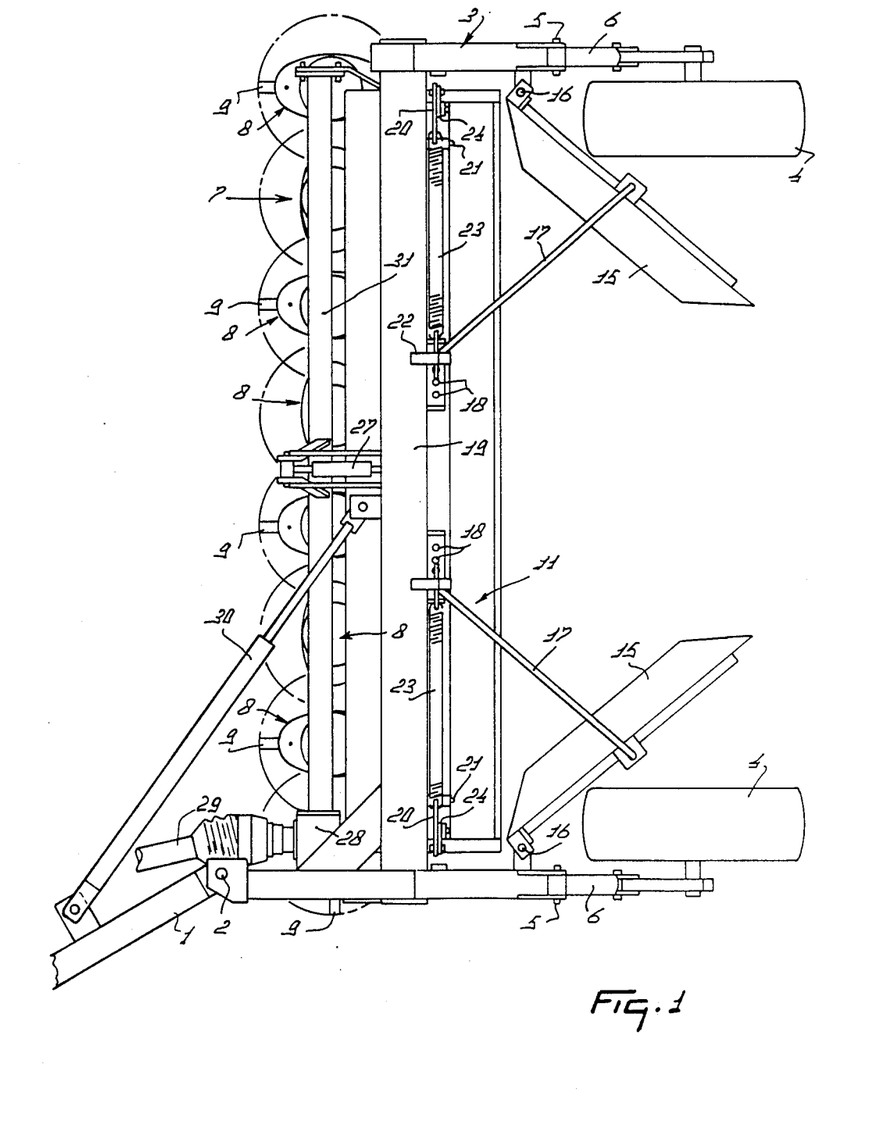
FIG. 1 is a plan view of a first embodiment of a mower-crusher.
Figure 2:
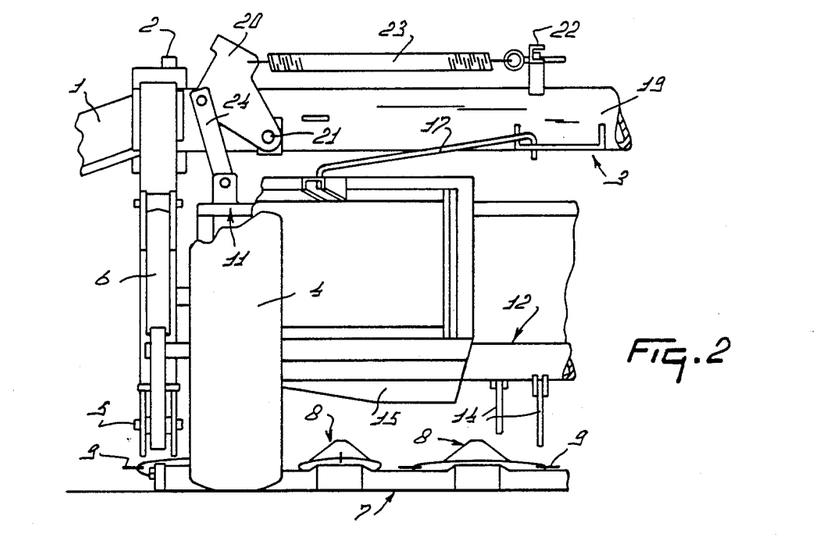
Figure 3:
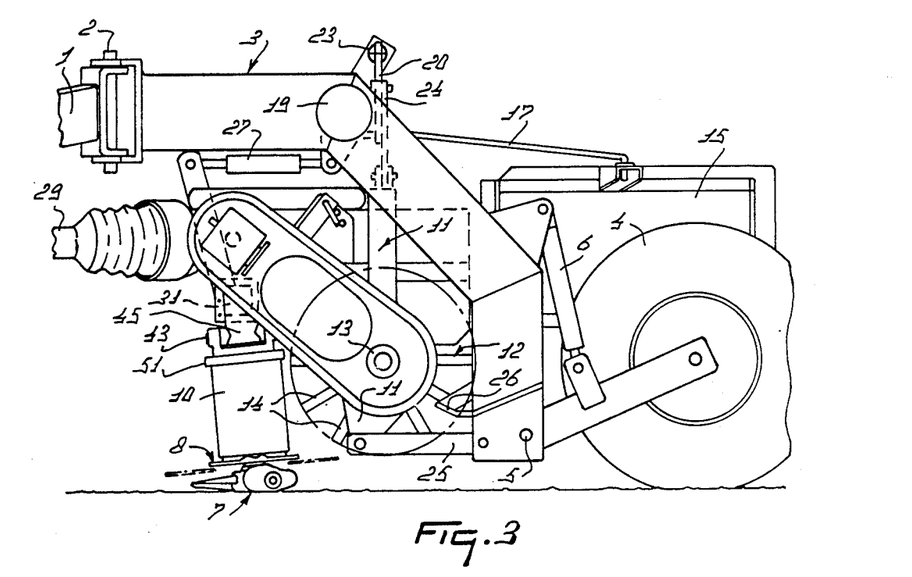

The mower-crusher, shown in plan view in FIG. 1, in side view in FIG. 3, and in partial, rear view in FIG. 2, is provided with a pivotal arm 1 for connection to a tractor. Pivotal arm 1 is connected by pivot 2 to a first frame 3 which is supported drivably by means of wheels 4. Wheels 4 are pivotably connected to first frame 3 by pivots 5. The pivotal movement of each of the wheels relative to first frame 3 is effected by means of a hydraulic cylinder 6.

The machine further includes a cutter bar, comprising a supporting beam 7 with mowing members 8. Mowing members 8 are disc-shaped, are provided at their outer periphery with blades 9 and are capable of rotation around upwardly directed shafts. The drive of mowing members 8 is accommodated in supporting beam 7. The two outermost mowing member are provided with drum-shaped crop guides 10 which rotate together with the associated mowing members.

The mower-crusher includes a second frame 11, in which a crusher device 12 is fitted. Crusher device 12 comprises a horizontally extending tube 13 to which crusher members 14 are mounted. Tube 13, together with crusher members 14, is capable of rotating around its longitudinal axis, i.e. in such a manner that the front side rotates upwardly. Consequently, the crop mown by the mowing unit is seized by crusher members 14, and then discharged upwardly and rearwardly; during this upward and rearward movement the crusher members 14 advantageously process the crop.

In order to collect the crop displaced rearwardly by crusher device 12 into a swath having a smaller width than that of the mowing machine, two swath boards 15 are arranged in first frame 3. Swath boards 15 are arranged in first frame 3 to pivot about vertical shafts 16 (FIG. 1). The angle at which swath board 15 is set can be adjusted by connecting rod 17 in different positions to first frame 3. A plurality of apertures 18 are provided for this purpose. Swath boards 15 include substantially vertical sections and sections that are folded obliquely downwardly and forwardly, so that the crop discharged rearwardly by crusher device 12 is optimally fed towards the swath being formed.

Second frame 11 is suspended from first frame 3 in such a manner that it is movable in the vertical direction. This suspension is described with reference to FIG. 2, in which only one side of the suspension means is shown. Attached to portion 19 of first frame 3 is tilting element 20 which is pivotable about a horizontal shaft 21 extending substantially in the direction of operative travel of the mower-crusher. Between tilting element 20 and a support 22 mounted on portion 19 there is arranged a tension spring 23 which compensates for the force exerted on tilting element 20 by tensile member 24. Tensile member 24, which has one end connected to tilting element 20, has its other end connected pivotably to second frame 11. In this manner, the lateral force exerted by tension spring 23 is converted into an upwardly directed force on second frame 11. Second frame 11 is also movably connected to first frame 3 by means of lower pivotal members 25 (FIG. 3), which are connected pivotably to both second frame 11 and first frame 3. The vertically movable second frame 11 is limited in its upward movement by lower pivotal members 25 contacting stop 26. Second frame 11 is also movably connected to first frame 3 by means of an upper pivotal member 27 which is pivotally connected to both second frame 11 and first frame 3. Upper pivotal member 27 is adjustable in length and by adjusting the length of upper pivotal member 27 it is possible to alter the position of second frame 11 relative to first frame 3. For example, when the length of upper pivotal member 27 is reduced, the position in which tensile member 24 acts on second frame 11 is moved slightly to the rear relative to the pivot shaft that provides the means by which lower pivotal members 25 are connected to second frame 11; tensile member 24 moves slightly downwards and also slightly to the rear.

Second frame 11 accommodates a gear box 28. Inside gear box 28, main drive shaft 29, coming from the tractor, is connected both to the drive of mower members 8 on supporting beam 7 and to the drive of crusher device 12.

Further, as seen in FIG. 1, a hydraulic cylinder 30 has one end connected pivotably to the pivotal arm 1 and the other end to first frame 3. By controlling the length of hydraulic cylinder 30, it is possible to adjust the pivotal angle of pivotal arm 1 with respect to the mower-crusher.

In addition, it should be noted that the mower-crusher shown in FIGS. 1, 2 and 3 is provided with protection screens (not shown). These protection screens consist of metal frames, across which there is arranged a plastic-coated cloth or any other type of flexible material which hangs down all around.

The mowing unit of the mower-crusher or, when the crusher device 12 is lacking, the mowing machine includes a cutter bar comprising supporting beam 7 and superjacent mowing members 8, a carrier frame 31 (FIGS. 1 and 3) and two connections between the cutter bar and carrier frame 31. The connections shown in the embodiment of FIGS. 1 to 3 are effected via the two outermost mowing members, both of which are provided with a substantially drum-shaped crop guide 10. The manner in which the first connection is effected is shown in FIGS. 4 and 5, while the manner in which the second connection is effected is shown in FIG. 6.

Figure 4:
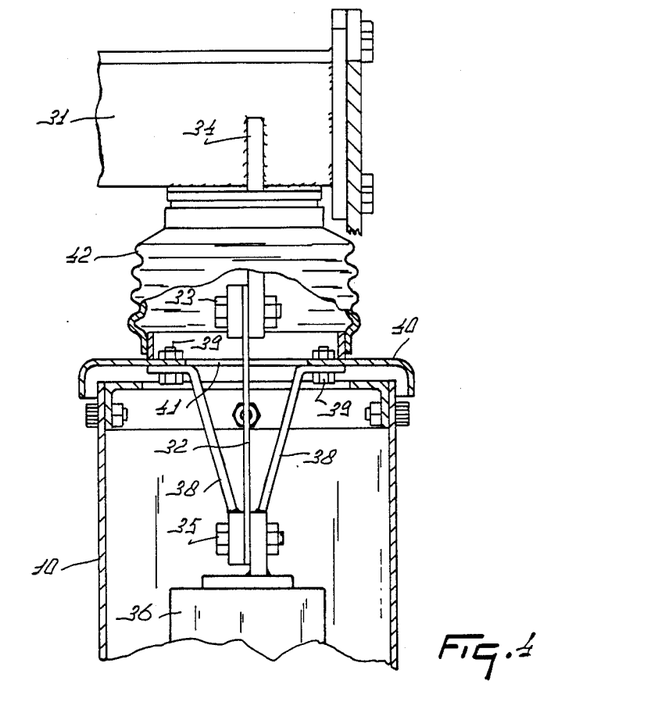
FIGS. 4 and 5 are cross-sectional views of a first connection between the carrier frame and the cutter bar of the mowing unit in the mower-crusher of FIG. 1.
Figure 5:
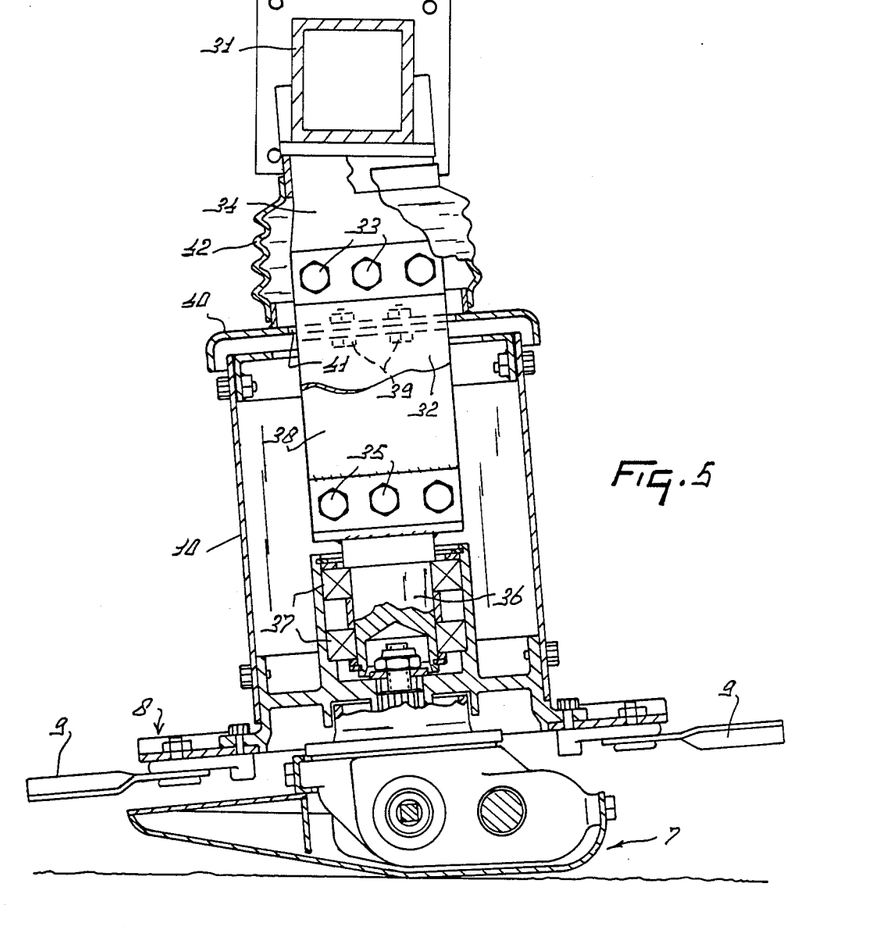

In FIGS. 4 and 5, the connection between supporting beam 7 and carrier frame 31 includes a resilient element 32 comprising a metal plate which, near its upper edge, is connected to carrier frame 31 by bolts 33 and connection plate member 34, and near its lower edge to supporting member 36 by means of bolts 35. Resilient element 32 extends in a plane parallelling the direction of operative travel. Supporting member 36 is bearing-supported in relevant mowing member 8 by means of bearings 37. Resilient element 32 is located partly within drum-shaped crop guide 10 mounted on mowing member 8. In addition, connection plate members 38 are bolted to supporting member 36 by means of bolts 35; these connection plate members 38 are themselves bolted by bolts 39 to cover 40 for drum-shaped crop guide 10. Cover 40 has a central aperture 41 through which resilient element 32 extends. A flexible sleeve 42 extends between cover 40 and carrier frame 31. Resilient element 32 and its means for connection 33, 34 to carrier frame 31 extend within sleeve 42. Resilient element 32 allows for both a slight bending and a slight shift of supporting beam 7 relative to carrier frame 31 in a vertical plane transverse to the direction of operative travel.

Figure 6:
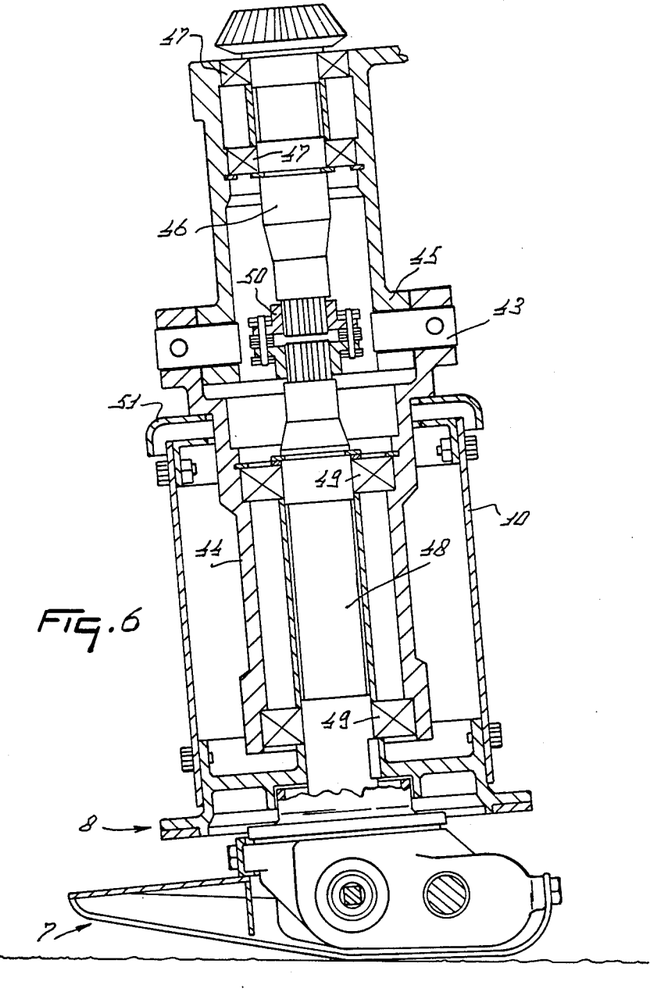
FIG. 6 is a cross-sectional view of a second connection between the carrier frame and the cutter bar of the mowing unit in the mower-crusher of FIG. 1.

In FIG. 6, the connection between supporting beam 7 and carrier frame 31 includes a pivot 43, the pivot shaft of which extends substantially horizontally in the direction of operative travel. Pivotal member 44 is pivotable about the pivot shaft relative to member 45 which is rigidly connected to carrier frame 31. The drive shaft for mowing members 8 in supporting beam 7 extends through member 45 and pivotal member 44. Upper portion 46 of the drive shaft is bearing-supported in member 45 by means of bearings 47 and lower portion 48 of the drive shaft is bearing-supported in pivotal member 44 by means of bearings 49. Upper portion 46 of the drive shaft is connected to lower portion 48 by means of flexible coupling 50, for example, a chain coupling or a universal joint, which is arranged in the region of the shaft of pivot 43. Pivotal member 44 is arranged partly within drum-shaped crop guide 10 disposed on the relevant mowing member 8. A cover 51 is rigidly connected to pivotal member 44, cover 51 being located over drum-shaped crop guide 10 and tightly contiguous thereto.

Figure 7:
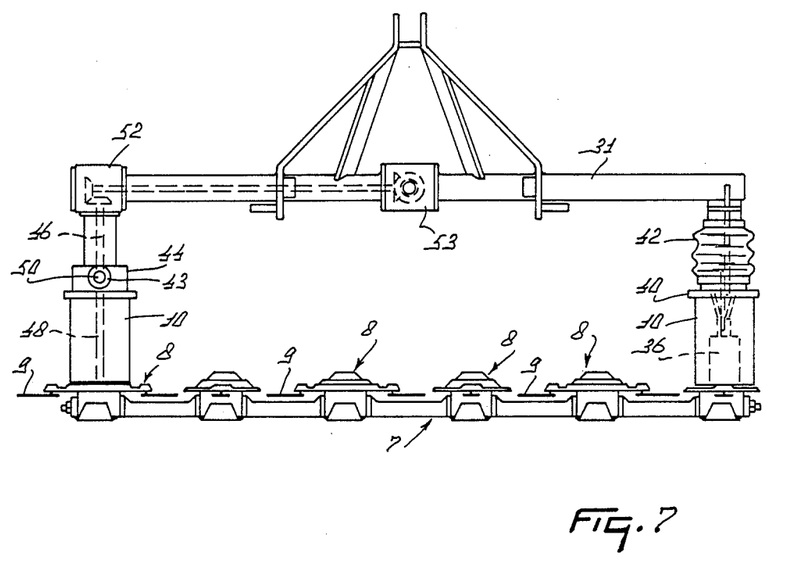
FIG. 7 is a schematic front view of a first embodiment of a front-mounted mowing machine according to the invention.

The invention as it has been described so far is not only suitable for use in a mowing machine or in a mower-crusher which, as is apparent from FIGS. 1 to 3, is moved by a tractor as a side-mounted machine but also in a front-mounted mower or front-mounted mower-crusher. The use in a front-mounted mowing machine is shown in FIG. 7. The second connection, as seen in FIG. 7, between supporting beam 7 and carrier frame 31 extends via gear box 52, while a second gear box 53 is arranged halfway in the carrier frame. Mowing members 8 are driven by a transmission system which extends from the power take-off shaft of the tractor via gear box 53, one half of carrier frame 31, gear box 52, member 45 and pivotal member 44 to the relevant outermost mowing member and from there to further mowing members 8. Resilient element 32 is included in the first connection between carrier frame 31 and supporting beam 7, while the second connection between carrier frame 31 and supporting beam 7 includes pivot shaft 43 with flexible coupling 50 in the drive shaft.

Figure 8:
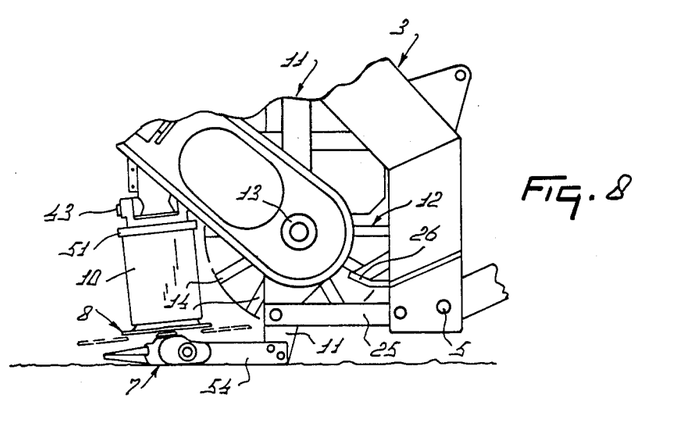
FIG. 8 is a partial side view of a mower-crusher in accordance with a second embodiment.

FIG. 8 shows a partial side view of a mower-crusher wherein the first connection between carrier frame 31 and supporting beam 7 does not extend via the relevant outermost mowing member but rather via crusher device 12 of the mower-crusher, that is by second frame 11. In this embodiment, the resilient element comprises a spring steel plate 54 which has one end connected to supporting beam 7 and other end to the lower end of second frame 11 of crusher device 12. The second connection between carrier frame 31 and supporting beam 7 can extend again via the relevant outermost mowing member, as is shown, for example, in FIG. 6 or in FIG. 9.

Figure 9:
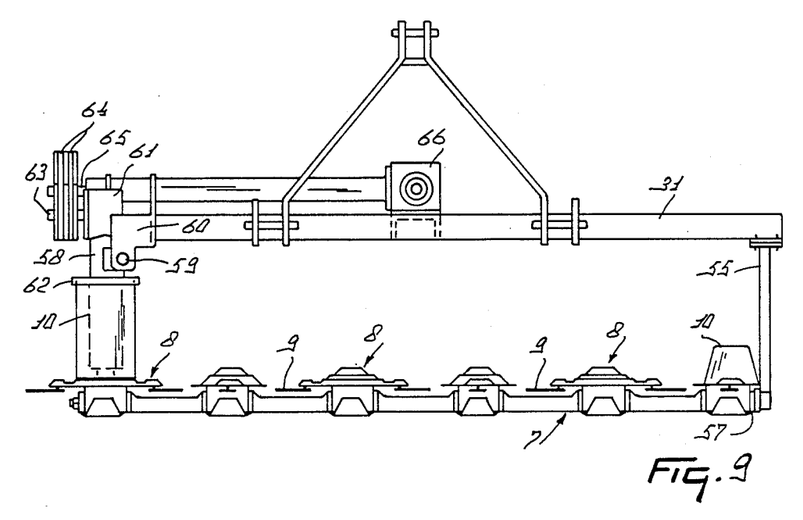
FIG. 9 is a schematic front view of a second embodiment of a front-mounted mowing machine according to the invention.
Figure 10:
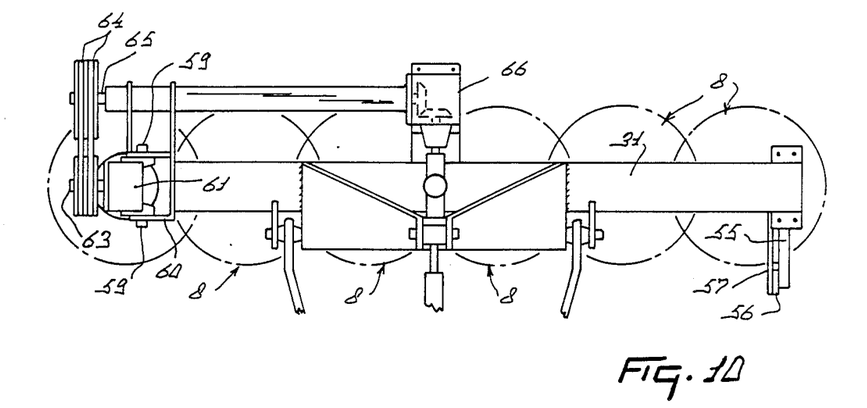
FIG. 10 is a plan view of the mowing machine of FIG. 9.
Figure 11:
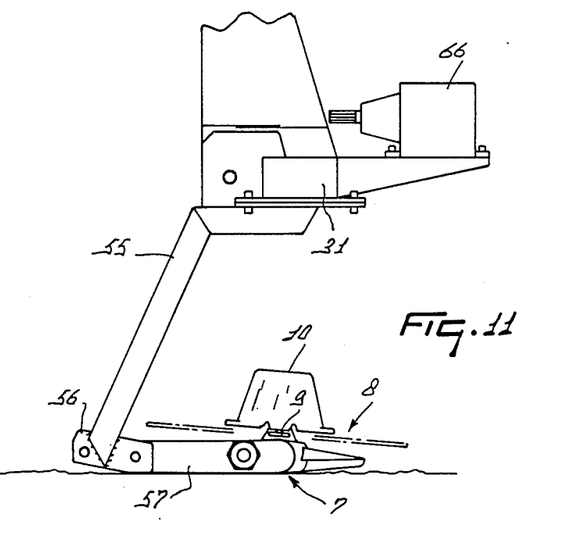
FIG. 11 is a side view of the mowing machine shown in FIG. 9.

FIGS. 9 to 11 show another embodiment of a front-mounted mowing machine in accordance with the invention. The first connection between carrier frame 31 and supporting beam 7 is arranged outside the reach of the mowing members. This connection incorporates a vertically extending connecting beam 55 which at its upper end is rigidly connected to carrier frame 31 and at its lower end to supporting beam 7 via an intermediate plate member 56 and a resilient element 57. Resilient element 57 comprises a substantially horizontally extending plate-shaped connection member, for example, a spring steel plate.

The second connection between carrier frame 31 and supporting beam 7 can be provided as shown in FIG. 6.

However, FIGS. 9 and 10 show a different embodiment. In FIGS. 9 and 10, carrier frame 31 is pivotally connected to sleeve-shaped member 58. To provide the pivotal connection, rigid pivot pins 59 are connected to sleeve-shaped member 58, around which fork-shaped end 60 of carrier frame 31 can pivot. Further, sleeve-shaped member 58 is connected rigidly to a transmission system box 61 from which the drive of mowing members 8 is effected via the drive shaft supported in sleeve-shaped member 58. The outermost mowing member 8, by means of which remaining mowing members 8 are driven, is again provided with a crop guide 10. Sleeve-shaped member 58 extends partly inside this crop guide 10 and includes an edge section 62 which is tightly contiguous to crop guide 10 and covers same. The forces acting on the cutter bar during operation are transferred by the drive shaft extending through this second connection between carrier frame 31 and supporting beam 7 to input shaft 63 of the transmission system in transmission system box 61. These forces can be such that the drive shaft and, via its bearing, sleeve-shaped member 58 and transmission system box 61 may be subjected to a slight displacement in a vertical plane perpendicular to the direction of operative travel. This also implies a slight displacement and/or pivotal movement of input shaft 63 in the vertical plane. Hence, input shaft 63 is here preferably driven by one or more belts 64, more specifically from shaft 65 which is rigidly supported relative to carrier frame 31. Shaft 65 is itself driven again by a power take-off shaft of the tractor via gear box 66.

The invention is not limited to the above-described embodiments; many modifications can be provided without departing from the scope of the invention. Thus, it is possible, for example to combine the disclosed front-mounted mowers with a crusher and to use the framework formed by the cutter bar, the carrier frame and the specific interconnections as described in various types of rotary disc-mowers.

We claim:

1. A mowing machine, comprising: a cutter bar which extends substantially transverse to the direction of operative travel over the field and having rotary mowing members arranged thereabove, said cutter bar connected for its support in at least two places to a carrier frame, at least one of said connections including a resilient element, said resilient element arranged in such a manner that movements of said cutter bar relative to said carrier frame are permitted in a substantially vertical plane transverse to the direction of operative travel, wherein said resilient element comprises a plate-shaped material extending in a substantially vertical plane parallel to the direction of operative travel.

2. A mowing machine as claimed in claim 1, wherein said resilient element effects a connection between said cutter bar and said carrier frame via a supporting member mounted centrally above one of said rotary mowing members, said resilient member extending substantially vertically in said substantially vertical plane parallel to the direction of operative travel of the mowing machine.

3. A mowing machine as claimed in claim 2, wherein said cutter bar is connected to the carrier frame in two places via different mowing members.

4. A mowing machine as claimed in claim 3, wherein said connections are effected via the two outermost mowing members of said cutter bar.

5. A mowing machine as claimed in claim 4, wherein one or more mowing members includes a substantially drum-shaped crop guide.

6. A mowing machine as claimed in claim 5, wherein a connection between said cutter bar and said carrier frame extends via or through one of said crop guides.

7. A mowing machine as claimed in claim 2, wherein said resilient element comprises a metal plate which is connected near its upper edge to said carrier frame and near its lower edge to said supporting member attached to said cutter bar.

8. A mowing machine as claimed in claim 7, wherein said resilient element further comprises a leaf spring having a thickness of three to four millimeters.

9. A mowing machine as claimed in claim 8, wherein said resilient element extends at least partly within a substantially drum-shaped crop guide disposed on a mowing member.

10. A mowing machine as claimed in claim 2, wherein said resilient element, which near its upper end is connected to said carrier frame, is connected near its lower end to a stationary supporting member arranged within a rotating drum-shaped crop guide.

11. A mowing machine as claimed in claim 10, wherein said supporting member is connected to the relevant mowing member in such a manner that it is rotatably supported relative thereto.

12. A mowing machine as claimed in claim 11, wherein said supporting member is provided with a cover disposed substantially over said drum-shaped crop guide.

13. A mowing machine as claimed in claim 12, wherein said cover has a central aperture through which said resilient element extends.

14. A mowing machine as claimed in claim 13, wherein between said cover and said carrier frame there extends a flexible sleeve within which said resilient element and/or its connection means extends.

15. A mowing machine as claimed in claim 14, wherein said cutter bar is connected in at least one place to said carrier frame via a pivot, the pivot shaft of said pivot extending substantially horizontally in the direction of operative travel of the mowing machine.

16. A mowing machine as claimed in claim 15, wherein said carrier frame is connected to a mowing member via said pivot.

17. A mowing machine as claimed in claim 16, wherein said mowing members are drivingly interconnected via said cutter bar and are driven via a drive shaft connected to one of said mowing members.

18. A mowing machine as claimed in claim 17, wherein said drive shaft is located at least partly within a substantially drum-shaped crop guide arranged on a relevant mowing member.

19. A mowing machine as claimed in claim 18, wherein an outermost mowing member is connected to said drive shaft.

20. A mowing machine as claimed in claim 19, wherein said carrier frame is connected via said pivot to said mowing member which is driven by said drive shaft.

21. A mowing machine as claimed in claim 20, wherein said drive shaft is provided with a flexible coupling in the region of said pivot shaft.

22. A mowing machine as claimed in claim 21, wherein said flexible coupling is a chain coupling or a universal joint.

23. A mowing machine as claimed in claim 22, wherein said drive shaft is bearing-supported above said flexible coupling in a portion which is rigidly connected to said carrier frame and said drive shaft is bearing-supported below said flexible coupling in a pivot member which is pivotable about said pivot shaft relative to said carrier frame.

24. A mowing machine as claimed in claim 23, wherein said pivot member is located at least partly within a substantially drum-shaped crop guide arranged on a relevant mowing member.

25. A mowing machine as claimed in claim 24, wherein said pivot member is fitted with a cover located over said drum-shaped crop guide and is tightly contiguous thereto.

26. A mowing machine as claimed in claim 25, wherein said cutter bar is connected to said carrier frame via the two outermost of said mowing members.

27. A mowing machine as claimed in claim 20, wherein said drive shaft is supported in a sleeve-shaped member to which said carrier frame is connected via said pivot, said sleeve-shaped member also being rigidly connected to a transmission system box from which the drive of said mowing members is effected via said drive shaft.

28. A mowing machine as claimed in claim 27, wherein an input shaft of a transmission system is driven by means of one or more belts.

29. A mowing machine as claimed in claim 1, wherein said connection between said cutter bar and said carrier comprising said resilient element is arranged outside the reach of said mowing members, said connection further comprising an upwardly extending connection beam which at its upper end is rigidly connected to said carrier frame and at its lower end is connected to said cuter bar via said plate-shaped material.

30. A mowing machine as claimed in claim 29, wherein said lower end of said connecting beam is connected to said cutter bar via a substantially horizontal connection element which constitutes said resilient element.

31. A mowing machine as claimed in claim 30, wherein said connection element is plate-shaped.

32. A mowing machine as claimed in claim 31, wherein said resilient element is a spring steel plate.

33. A mowing machine as claimed in claim 1, wherein said carrier frame is suspended from a frame via which the mowing machine is connected to a tractor.

34. A mowing machine as claimed in claim 33, wherein said carrier frame is suspended from a frame which is provided with wheels.

35. A mowing machine as claimed in claim 34, wherein it co-operates with a crusher device suspended from said frame.

36. A mowing machine as claimed in claim 35, wherein said connection between said carrier frame and said cutter bar extends via said crusher device, said resilient element being arranged between said crusher device and said cutter bar.

37. A mower-crusher, comprising: a cutter bar which extends substantially transverse to the direction of operative travel over the field and having rotary mowing members arranged thereabove, said cutter bar being connected for its support in at least two places to a carrier frame which is suspended from a first frame, said first frame providing the means by which the mower-crusher is connected to a tractor, a crusher device also being suspended from said first frame, wherein said connection between said carrier frame and said cutter bar is effected via said crusher device, a resilient element being arranged between said crusher device and said cutter bar to effect said connection.

38. A mower-crusher as claimed in claim 37, wherein said resilient element comprises a spring steel plate arranged between a lower end or a point near the lower end of said crusher device and said cutter bar.

39. A mowing machine comprising:
a cutter bar which extends in a substantially transverse direction relative to the mowing machine's direction of operative travel, said cutter bar comprising rotary mowing members;
a carrier frame disposed above said cutter bar including means for fastening it to a tractor, said cutter bar being connected for its support via the two outermost mowing members to said carrier frame by flexible connecting means; at least one of said flexible connecting means comprising a substantially drum-shaped crop guide wherein a connection between said cutter bar and said carrier frame extends via or through said crop guide and includes a resilient element which is plate-shaped and extends in a substantially vertical plane parallel to said direction of operative travel, whereby limited movements of said cutter bar relative to said carrier frame are permitted in a substantially vertically plane transverse to said direction of operative travel.

40. A mowing machine which comprises:
a cutter bar which extends substantially laterally relative to the mowing machine's direction of operative travel, said cutter bar comprising rotary members;
a carrier frame including means for interconnection to a tractor disposed above said cutter bar; at least two flexible connecting means supportably connecting said cutter bar to said carrier frame, at least one of said flexible connecting means comprising resilient means which is constructed and arranged to permit limited resilient movements of said cutter bar in lateral directions relative to said direction of operative travel and to prevent relative movements of said cutter bar in directions generally opposed to said direction of operative travel.

* * * * *